(12) United States Patent
Sathyadevan et al.

(10) Patent No.: US 10,057,382 B2
(45) Date of Patent: Aug. 21, 2018

(54) INTELLIGENT "IOT GATEWAY"

(71) Applicant: Amrita Vishwa Vidyapeetham, Tamil Nadu (IN)

(72) Inventors: Shiju Sathyadevan, Kerala (IN); Bipin Kunjumon, Kerala (IN); Harikrishnan Padmanabha Pillai, Kerala (IN); Krishnashree Achuthan, Kerala (IN)

(73) Assignee: Amrita Vishwa Vidyapeetham (IN)

( * ) Notice: Subject to any disclaimer, the term of this patent is extended or adjusted under 35 U.S.C. 154(b) by 268 days.

(21) Appl. No.: 14/991,202

(22) Filed: Jan. 8, 2016

(65) Prior Publication Data
US 2017/0094033 A1    Mar. 30, 2017

(30) Foreign Application Priority Data
Sep. 24, 2015 (IN) ............................ 5106/CHE/2015

(51) Int. Cl.
| G06F 13/00 | (2006.01) |
| H04L 29/06 | (2006.01) |
| H04W 4/70 | (2018.01) |
| G06N 99/00 | (2010.01) |
| H04L 29/08 | (2006.01) |
| G06F 9/445 | (2018.01) |
| H04W 4/00 | (2018.01) |

(52) U.S. Cl.
CPC ............ H04L 69/03 (2013.01); G06F 9/4451 (2013.01); G06N 99/005 (2013.01); H04L 67/12 (2013.01); H04L 67/2823 (2013.01); H04L 69/08 (2013.01); H04L 69/24 (2013.01); H04W 4/005 (2013.01); H04W 4/70 (2018.02)

(58) Field of Classification Search
CPC ..... H04L 69/03; H04L 69/24; H04L 67/2823; H04L 67/12; H04L 69/08; G06N 99/005; G06F 9/4451; H04W 4/005; H04W 4/70
USPC .................................................. 709/238, 230
See application file for complete search history.

(56) References Cited

U.S. PATENT DOCUMENTS

| 6,199,099 | B1 * | 3/2001 | Gershman ......... G06F 17/30867 707/999.003 |
| 9,065,683 | B2 * | 6/2015 | Wolosewicz ............ G06F 21/10 |
| 9,197,551 | B2 * | 11/2015 | DeCusatis ............... H04L 45/52 |
| 9,391,800 | B2 * | 7/2016 | Rangarajan ......... H04L 12/4633 |
| 2007/0174624 | A1 * | 7/2007 | Wolosewicz ............ G06F 21/10 713/176 |
| 2012/0030041 | A1 * | 2/2012 | Wolosewicz ....... G06Q 30/0277 705/14.73 |
| 2014/0269705 | A1 * | 9/2014 | DeCusatis ............... H04L 45/52 370/390 |

(Continued)

Primary Examiner — Kenneth R Coulter
(74) Attorney, Agent, or Firm — Donald R. Boys; Central Coast Patent Agency, LLC

(57) ABSTRACT

A gateway device has a CPU, a power source, a digital memory, physical communication ports and wireless communication circuitry receiving data from data-gathering devices, an interface to a wide-area network, dedicated hardware pipelines managing the data received, and coded instructions executing on the CPU from a non-transitory medium. The CPU connects physically or wirelessly to one of the data-gathering devices, obtains characterization information for a protocol generic to the data-gathering device, selects code stored in the digital memory, and programs firmware in a dedicated pipeline to receive data from the data-gathering device in the generic protocol.

16 Claims, 10 Drawing Sheets

(56) References Cited

U.S. PATENT DOCUMENTS

2015/0263865 A1\* 9/2015 Rangarajan ......... H04L 12/4633
370/254

\* cited by examiner

INTELLIGENT "IOT GATEWAY"

CROSS REFERENCE TO RELATED DOCUMENTS

The present application claims priority to Indian Application 5106/CHE/2015, filed Sep. 24, 2015 and titled Intelligent "IoT Gateway". All disclosure of the earlier application is incorporated herein at least by reference.

BACKGROUND OF THE INVENTION

1. Field of the Invention

The present invention is in the field of data network communications and pertains particularly to methods and apparatus for bridging operationally disparate network communications devices for seamless communication over a data network.

2. Discussion of the State of the Art

Network communications generally pertains to back and forth data communication between two or more nodes over a data network. A data network encompasses a network backbone and all of the lines equipment and access points making up the network as a whole, including any connected sub networks of a wired or a wireless nature. In current practice of data network communications, sub-networks have connection to main networks such as the Internet network through such as a network router, a network bridging device, or a network gateway device.

The field of data networking and communications has evolved recently with advent of the concept of the Internet of Things (IoT). IoT refers to interconnection of embedded computing devices through an existing Internet backbone network. With the advent of IoT it is expected that an unprecedented number of network-capable devices will be connected to the Internet. Such heterogeneous devices may fall into one of three device categories: legacy devices, plug-and-play devices, or IoT-enabled devices.

Limitations in communication flexibilities exist relative to embedded devices connecting to an IoT network. For example the embedded (dedicated purpose) nature of some of these devices dictates that they may communicate over the network with other "like" devices using a communications protocol common to the communicating devices and supported at a network server or gateway. Disparate devices that might be useful in service as IoT components have widely varying configurations, varying access to communications protocols, and may run disparate operating systems.

Furthermore, communications handling must be performed very quickly and efficiently on the local devices and in the network in order to realize real-time or near-real-time results of IoT data processing. Therefore, what is clearly needed is a network gateway device that may reduce or eliminate problems mentioned above.

BRIEF SUMMARY OF THE INVENTION

In an embodiment of the invention a computerized gateway device is provided, comprising a central processing unit (CPU), a power source, a digital memory coupled to the CPU, one or both of physical communication ports and circuitry providing a wireless communication interface receiving data in a variety of communication protocols from a plurality of heterogeneous data-gathering devices, an output interface to a wide-area network, a plurality of dedicated hardware pipelines managing the data received from the data-gathering devices through execution of firmware in the hardware of the pipelines, and coded instructions executing on the CPU from a non-transitory medium. The CPU, executing portions of the coded instructions, connects physically or wirelessly to one of the data-gathering devices, obtains protocol characterization information for a protocol generic to the data-gathering device, selects pieces of code from code stored in the digital memory according to the protocol characterization information, and programs the firmware in a dedicated pipeline to receive data from the data-gathering device in the generic protocol, and to communicate that data to the wide area network at the output interface in a generalized protocol compatible with an upstream processing nodes.

In one embodiment the wide area network is an Internet network. Also in one embodiment the protocol characterization information is sent to the gateway, or pulled by the gateway from one of the data-gathering devices in the form of an extensible markup language (XML) characterization file (XCF). Also in one embodiment the protocol characterization information includes data specifying an interface type required during communications. Also in one embodiment the computerized gateway device procures generalized protocol characterization information and builds an XML characterization file.

In one embodiment of the invention the generalized protocol is a request-response model controlled by the upstream processing node. Also in one embodiment the upstream processing node manages the data-gathering devices by downstream messaging to the devices through the computerized gateway device. Also in one embodiment the coded instructions comprise a machine-learning algorithm that builds knowledge of protocol characteristics.

In an alternative aspect of the invention a method is provided, comprising steps of accessing by a computerized gateway device, through execution of coded instructions by a CPU from a non-transitory medium, protocol characteristics of data gathering devices coupled to the gateway device through either physical ports or by circuitry providing wireless communication, building by execution of the coded instructions, selecting pieces of code from a digital memory, firmware programs consistent with the protocols of the data-gathering devices for dedicated pipelines to manage data from the data-gathering devices through the gateway to an output interface coupled to a wide area network, and delivering data through the dedicated pipelines to the output interface in a generalized format compatible with communication with an upstream processing node in the wide area network.

In one embodiment of the method the wide area network is an Internet network. Also in one embodiment the protocol characterization information is sent to the gateway, or pulled by the gateway from the data-gathering devices in the form of an extensible markup language (XML) characterization file (XCF). Also in one embodiment the protocol characterization information includes data specifying an interface type required during communications. Also in one embodiment the computerized gateway device procures generalized protocol characterization information and builds an XML characterization file.

In one embodiment of the method the generalized protocol is a request-response model controlled by the upstream processing node. And in one embodiment the upstream processing node manages the data-gathering devices by downstream messaging to the devices through the computerized gateway device.

DETAILED DESCRIPTION OF THE INVENTION

In various embodiments described in enabling detail below, the inventor provides a unique system for communicating over a network with dynamic support for communications protocols. The present invention is described using the following examples, which may describe more than one relevant embodiment falling within the scope of the invention.

Figure 1:
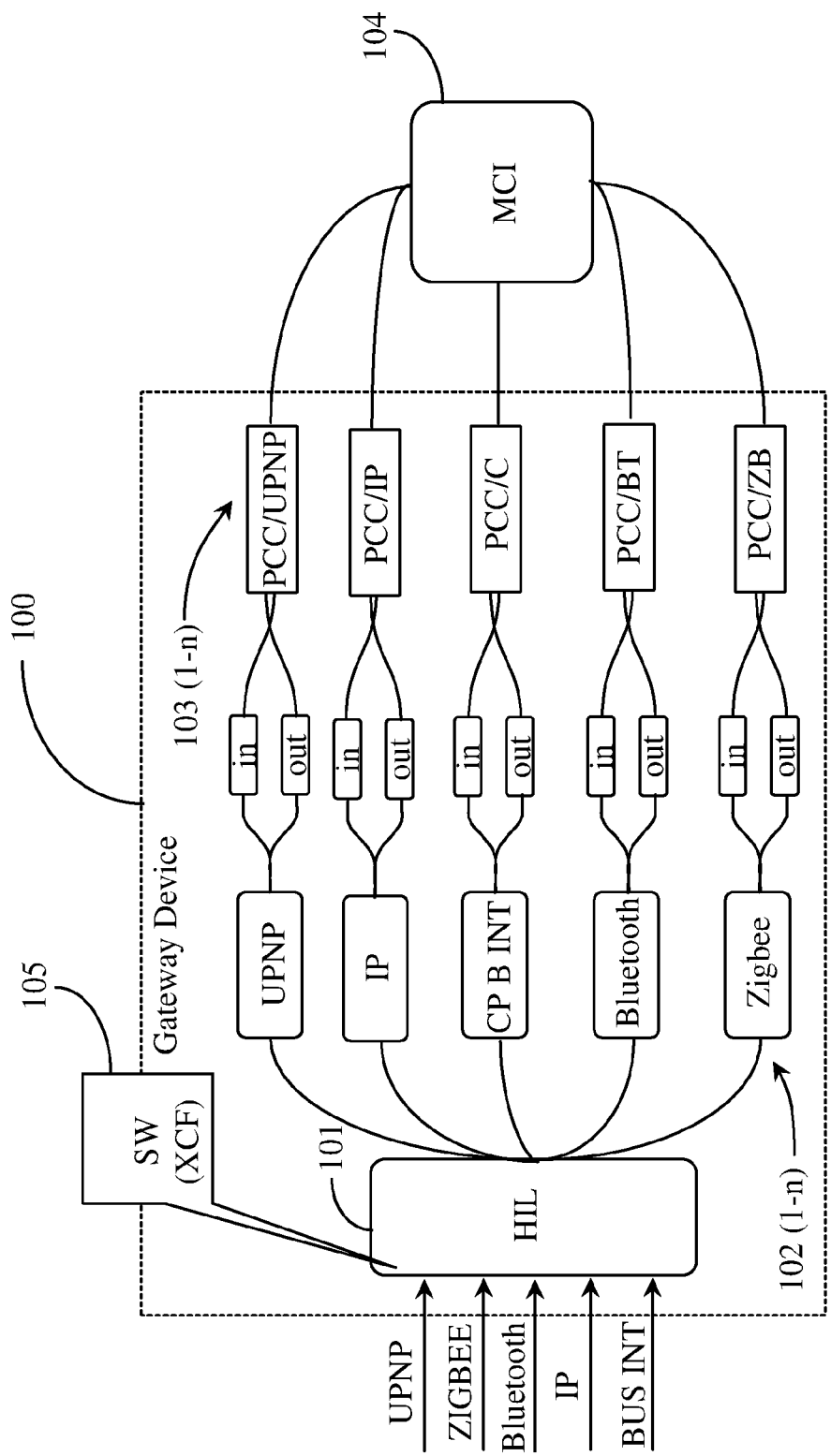
FIG. 1 is a block diagram depicting a gateway device with dedicated channel architecture according to an embodiment of the present invention.

FIG. 1 is a block diagram depicting a gateway device 100 with dedicated channel architecture according to an embodiment of the present invention. Gateway device 100 is adapted to serve as a gateway in communication between one or more sub devices such as one or more active sensors, or wireless communications devices having sensor or other data for transmission onto a larger network.

Device 100 is a relatively lightweight device available to the inventors with a small operating footprint such as a Beagle-Bone (open systems) computing device. The actual hardware is not illustrated in this example but it is assumed present on the device and is available to the inventors. Gateway device 100 in this example includes a microprocessor, a random access memory (RAM), a graphics accelerator, an Advanced RISC Machine (ARM) cortex processor, and at least one computer processing unit (CPU) adapted to host software applications that may add functionality to the device.

Gateway device 100 includes a wireless transceiver which in one implementation may be a Universal Asynchronous Receiver/Transmitter (UART) Zigbee wireless module for interfacing with connected sub devices. Gateway 100 is adapted as a gateway device that routes data between heterogeneous sub devices and one or more nodes on a data network such as the Internet network. As such it will be appreciated by one with skill in the art that sub devices may be heterogeneous devices relative to operation and or communications protocols.

One object of the present invention is to adapt gateway 100 via software instruction to dynamically construct appropriate work flow, protocol-specific operation structures and the like for any of several protocols used by sub devices or applications reporting data where that data must be routed through the gateway device and onto a larger network such as the Internet network. Of particular focus is the use of one or more gateway devices such as device 100 in an Internet of Things (IoT) network.

A Gateway for IoT refers to a universal gateway with respect to processing messages from sub devices on a local network, the sub devices communicating using heterogeneous protocols. It is desired that such a gateway may communicate to any type of connected device inside a sub network and route data from these disparate sub devices to an upper software platform (off device), where the routed data may be analyzed and processed for further operations according to prevailing IoT parameters for the instant application.

In regards to the above, the inventors provide a protocol characterization layer (PCL) (SW) 105 that serves as an abstraction layer (communication interface) for generalizing protocols used by connected sub devices and then reconstructing appropriate protocol specific workflow operations for efficient communication through one of more than one dedicated channels or "pipeline" on the gateway device.

Gateway device 100 includes a hardware interface layer (HIL) 101. HIL 101 sits behind physical communications interfaces such as UART (wireless interface) and universal serial bus (USB) on the gateway device. Gateway device 100 includes a socket interface layer (SIL) not illustrated here situated between the HIL and one or more protocol communications channels on the device. HIL 101 exists in the data link layer of the Open Systems Interconnection model used in network communications support. The SIL exists in the network layer of the open system integration (OSI) model. For full duplex communication a client/server socket level communications channel is used where the client pushes the data to the device and the server pulls the data from the device.

Gateway device 100 includes a tightly coupled "pipe" model for communication between the two interfacing sides of the gateway. In this model one end of the pipe model is tightly coupled to the hardware interface while the other is tightly coupled to the communications channel for each protocol. An object of the invention is to interact using heterogeneous protocols from disparate communication interfaces such as serial and socket interfaces, for example, through an abstracted or generalized communications interface such as the above-mentioned protocol characterization layer provided by SW 105.

In this example, gateway device 100 may receive data from devices according to several different protocols. Those listed here are UPnP, Zigbee, Bluetooth, IP, and BUS interface. Intelligent program (InP) (SW) 105 includes a capability of generating or otherwise acquiring an eXtensible Markup Language (XML) file that abstractly characterizes the protocol and operations used by the connected sub device in communications. In one embodiment when a sub device pushes data to gateway device 100, it sends an XML characterization file (XCF). In another embodiment SW 105 may parse incoming data and then build an XCF file from the received data. In yet another embodiment the gateway may access a device and fetch characterization data from the device. Characterization data describes protocol specific workflow, interface type etc. for the device and application communicating to the gateway.

HIL 101 has connection to a plurality of communications channel interfaces 102 (1-*n*). These consist of UPnP, IP (v4,v6), custom protocol BUS interface (CP BUS INT), Bluetooth, and Zigbee. It is noted that fewer or more dedicated channels may exist without departing from the spirit and scope of the present invention. Channel interfaces 102 (1-*n*) are tightly coupled with dedicated in/out pathways hardwired to dedicated protocol communications channel (PCC) interfaces 103 (1-*n*). In this embodiment, each supported protocol has its own dedicated pipeline from the device side of the gateway to the processing side of the gateway.

Gateway device 100 connects to a middleware communications interface (MCI) 104. The protocol characterization layer in intelligent program (InP) 105 includes operations for generalizing the protocols of incoming communications. In general there may be three operations involved in the generalization of protocols. A first operation parses an incoming XML file to generate an XCF file. A next operation builds an application (APP) profile. A third operation generates the required applications for aggregating protocols, intelligent program logistics, and an auto-run application.

Figure 2:
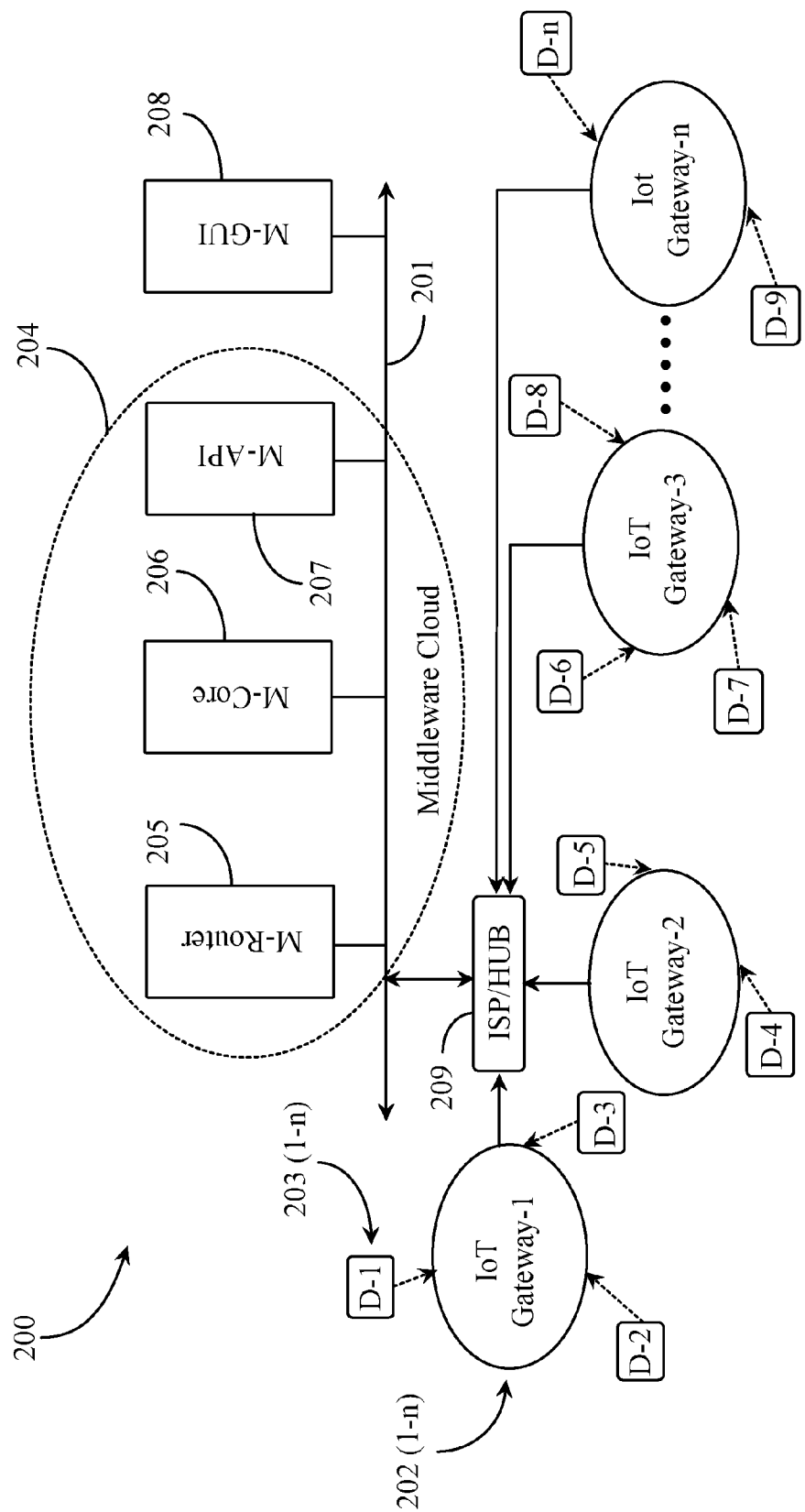
FIG. 2 is an architectural diagram of a communications network supporting a sub-network of gateway devices according to an embodiment of the present invention.

FIG. 2 is an architectural diagram of a communications network 200 supporting a sub-network of IoT gateway devices according to an embodiment of the present invention. Communications network 200 includes the well known Internet network depicted herein by an Internet backbone 201. Internet backbone 201 represents all of the lines, equipment, and access points that make up the Internet as a whole including any connected sub-networks. Therefore there are no geographic limitations to the practice of the present invention.

A plurality of IoT gateway devices 202 (1-*n*) are depicted in a sub-network of such devices having connection to Internet backbone 201 through an Internet service provider (ISP) or network HUB (router) 209. The gateway devices may occupy one or more than one sub network connected to the Internet without departing from the spirit and scope of the present invention. Various and sundry distributive models may exist.

Gateway devices 202 (1-*n*) may be wirelessly operated and networked to communicate over a wireless carrier network to access point 209. In one embodiment gateway devices 202 (1-*n*) are distributed on an Ethernet network or local area network (LAN). In one embodiment one or more of the gateway devices operate on a low power personal area network (PAN). Each IoT gateway device 202 (1-*n*) has communication with one or more than one sub-device (D) 203 (1-*n*). Sub-devices (D) 203 (1-*n*) may be one or a combination of devices such as a wireless sensors, Bluetooth devices and devices addressed using Internet protocol version 4 (IPv4) or IPv6/6LoWPAN. IoT gateway-1 (202 (1)) receives data from sub-devices D-1, D-2, and D-3 (203 (1-3)). IoT gateway-2 receives data from sub-devices D-4 and D-5. Sub-devices D-6, D-7, and 5 D-8 send data to IoT gateway device-3. Sub devices D-9-Dn send data to IoT gateway-n on the network.

Gateway devices 202 (1-*n*) route data through access point 209 to middleware (SW) depicted herein as a middleware cloud 204. Middleware cloud 204 may be thought of as an upper platform in the IoT infrastructure where data received over the network from registered IoT gateway devices is processed. In one embodiment the middleware observes a request/response model to fetch or retrieve data from each accessible gateway device 202 (1-*n*). In one embodiment requests and responses are sent over the Internet using a message queue telemetry transport (MQTT) protocol. MQTT is adapted to handling high volumes of data requests.

Middleware cloud 204 includes a middleware router 205 supported by Internet backbone 201. Middleware router 205 may function as a bridge between gateway devices 202 (1-*n*) and a middleware core 206 in middleware cloud 204 and supported by Internet backbone 201. In one embodiment middleware router 205 is an Apache server running Apache Camel routing software. Other data routing applications may also be used in place of Camel without departing from the spirit and scope of the invention. Apache Camel has, according to the inventors, the required capability to manage multiple different streams of data incoming from different end devices such as devices 203 (1-*n*).

In one implementation, Camel spring DSL comprises the routing software. Middleware router 205 may specify static routs in a spring xml file. Middleware router 205 may create dynamic routes on the fly or as needed. In one implementation middleware router 205 requests for active gateway devices in each startup operation and creates gateway routes based on that reply. Each gateway device may have four MQTT routes. These are (1) iotmkgatewayid>/request. The gateway device "listens" to middleware for an incoming ID request. (2) iotmkgatewayid>/response. The gateway device responds to each middle request. (3) iotm/setup. This channel is a global channel that listens to the network for common set up information. (4) iotmkgatewayid>stream. The gateway device sends streaming data from one or more sub devices.

Middleware core 206 maintains device identification, addressing and other gateway profile information of all registered IoT gateways 202 (1-*n*). Middleware router 205 creates a secure route to the granularity of each application streaming data to the platform. In some applications gateways 202 (1-*n*) may perform one or more actions based on requests from middleware core 206. Each gateway 202 (1-*n*) responds to each request received from the middleware platform. Other data streams are dedicated streams maintained for sending setup messages and for carrying out a registration process for each connected gateway.

In one implementation middleware router 205, middleware core 206, and middleware API 207 are resident on and executable from one network-connected node such as a powerful server. It will be apparent to one skilled in networking that such a server may be based in a sub network without departing from the spirit and scope of the present invention.

Middleware router 205 may be connected to middleware core 206 through a broker-less messaging queue such as 0MQ (zero M queue). 0MQ (not specifically illustrated) is similar to an embedded networking library and functions like a concurrency framework. Because it is a broker-less queue it may operate faster than other queues that may be brokered. 0MQ may carry atomic messages that take action on sockets such as in process, inter-process, transfer control protocol (TCP) and multicast sockets. Socket patters may be publish and subscribe, task distribution, and request and reply. 0MQ is asynchronous and can create scalable multi-core applications in the form of asynchronous message processing tasks.

Requests to middleware router 205 from middleware core 206 come through 0MQ and are categorized according to Gateway IDs and rerouted to the gateway devices. Responses back from gateway devices are categorized according to gateway IDs and queues in 0MQ for processing by middleware core 206. Middleware router 205 connects all of the registered IoT gateways through MQTT routes. MQTT is a machine-to-machine (M2M) IoT connectivity protocol. MQTT is a lightweight message transport application leveraging a publish and subscribe model. In one embodiment different MQTT route topics are assigned to the different data streams received through the connected gateway devices Middleware core 206 may be an object-oriented paradigm. It may handle all requests and responses from users and may also track the state and health of each gateway active on the network. Middleware core 206 may process all user requests, check the state and health of each active gateway, and handle different types of gateway responses with respect to context and protocols.

Any preregistered gateway becoming active or "booting" on the network of a middleware server sends an ACTIVEGW command to the middleware core. The middleware core responds by updating status of the gateway device to "active". Middleware core 206 may use a command REGISTER to register a new IoT gateway on the network. The sending of this command may be triggered by a user requesting to register a new device on the network. The middleware core may ask for a unique gateway internal ID stored on the gateway device to be registered. The gateway device responds with the unique ID which may be stored by the middleware. When the device boots on the network the middleware may check the ID of the gateway against the stored ID to identify the gateway device and may then update the status of the device to REGISTER.

Middleware core 206 may use a PINGGWAY command to check any gateway on the network for operational health. A ping interval of a specified period of time may be set for status checking. The gateway responds with current operational stats including available memory, CPU, network information, and power availability in some cases. Middleware core 206 may send an ADROUTE command to middleware router 205 to add a new route for a gateway device. The middleware router may respond with a ROUTEUP command back to the middleware triggering the middleware to return an active gateway list.

Several commands may exist for searching for devices according to the protocols they use. A command BTSEARCH may exist for adding a Bluetooth device resulting from a user request. The middleware may parse the data portion of the user request for Bluetooth machine address (MAC) and may respond with current status of the Bluetooth MAC in the piconet of the gateway device. The command IPSEARCH may be used to search for an IP registered device with a specific ID. The action parses data for device MAC and the response includes the IP network address of the host IP device.

The command ZBSEARCH may be used to search for a Zigbee wireless network under a gateway device. The command UPSEARCH may be used to search for Plug and Play devices on a registered IP device, more particularly, the UPnP Services in the Gateway LAN which can be discovered within the DEFAULT_TIMEOUT interval. The gateway may return the URI for each Service as JSON Object in a JSONArray in data part of response.

In one implementation the command SCPDFIND may be used to retrieve one or more service control protocol documents (SCPD) relative to one or more UpnP devices on an IP device. A command UPNPINVK may be used to initiate or "invoke" a UPnP service on an IP registered device. A command PNSEARCH may be used to search a piconet on a gateway. A command IPV6FIND may be used to look for an IPv6 network under the gateway. A command STRTSTRM may be used to start a sensor stream from a Zigbee device. A command STOPSTRM may be used to stop a Zigbee sensor stream.

Middleware core 206 may use representational state transfer protocol or REST communication protocol. Therefore the middleware router is connected to the middleware core using a fast and reliable communications channel. REST uses synchronous communication and queuing under an asynchronous communications model. To respond in real time to user queries, the middleware core provides a sequence number and command to each request. In this aspect the middleware core may map responses into the user queries by leveraging the fields in the responses from the gateways. In this way, synchronous communication is enabled over an asynchronous channel.

Middleware cloud 204 includes a middleware application program interface (API) server 207. This provides a user interface for handling communications from a user. A user may access the system through a middleware graphical user interface (GUI) from any point on the network. In this example, a middleware GUI (M-GUI) node 208 is depicted enabling user interface with the middleware platform from an administrative point of view.

Middleware API 207 handles communications from an administrative user. It provides various REST-based APIs enabling control of and management of the entire platform. Each API may be secured using the user name and an access token. The access token may be regenerated for each log-in event. Middleware API 207 consists of basic layers not specifically illustrated here. A resource layer in middleware API is responsible for processing input data and converting it to a data object for further internal processing. The API also includes a mapper layer responsible for mapping user input to data object, mapping the data object to a database and the database object to the data object. This is mainly to hide certain data during internal processing. The API may further include a helper layer that interfaces between the resource layer and a service layer. The helper layer is responsible for calling appropriate services according to current process behavior. A service layer exists in the API for communicating with the database and performing the database operations.

Figure 3:
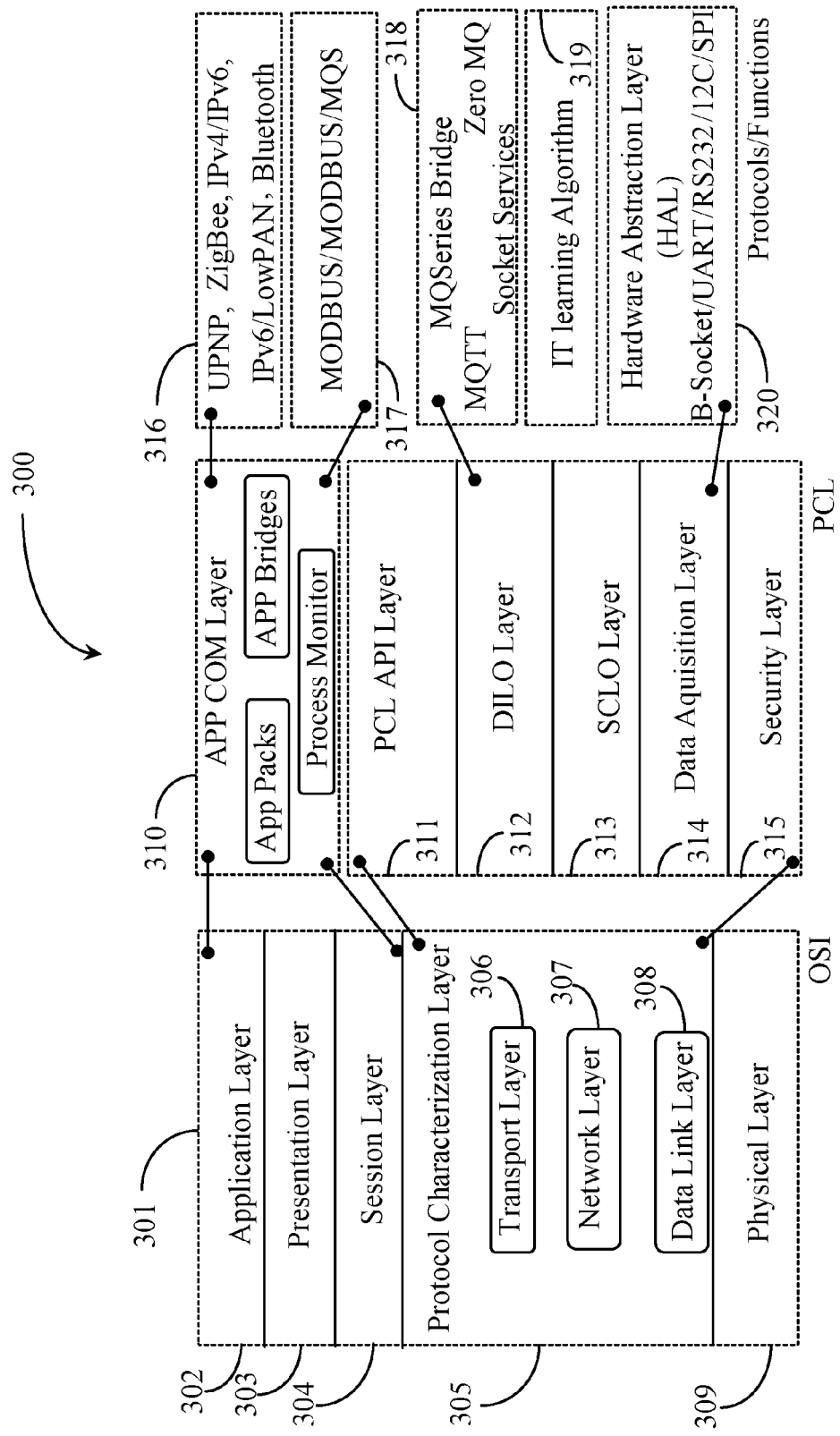
FIG. 3 is a block diagram depicting integrated network software stacks and available functions and protocols to the gateway device of the present invention.

FIG. 3 is a block diagram 300 depicting integrated network software components providing functions and protocols that may be integrated into the SW stack on the IoT gateway device of the present invention. Block diagram 300 depicts an open system integration (OSI) software stack 301 for handling basic network communications and functionality. Subsequent OSI stack representation 301 is expanded out to the right to depict the more granular components integrated into the OSI SW on the gateway device. In this embodiment the standard OSI software stack is directly modified with the addition of protocol characterization layer 305. PCL 305 provides a high level characterization of particular protocols structures and work flows used in communications between heterogeneous devices.

In general discussion, application layer 302 supports application and end-user processes. Presentation layer 303 provides independence from difference in data presentation. Session layer 304 establishes and manages connections established between applications. Physical layer 309 provides the hardware means of sending and receiving data over a carrier network. This layer conveys the bit stream. An application communications layer 310 is depicted in association with application layer 302, presentation layer 303, and session layer 304 to show appropriate application packages, application bridges, and a "shove"-based process monitor module. The particular protocols covered are listed in block 316 and include but may not be limited to UPnP, Zigbee, IPv4/IPv6, and IPv6/LowPAN, and Bluetooth. Likewise in block 317 MODBUS protocol layer (layer 7 in standard OSI model) is depicted. As an enhancement to MODBUS, MODBUS support for a message queue series (MQS) bridging facility is additionally provided.

In this example, PCL 305 is integrated in the area of the transport, network, and data link layer. For reference, the transport layer 306 provides transparent transfer of data between systems. The network layer 307 provides switching and routing function, network traffic management, addressing, error handling, etc. The data ink layer provides encoding/decoding, transmission protocol information, flow control and frame syncing, etc. The data link layer comprises two sub-layers which are the media access control (MAC) layer, and the logical link control (LLC) layer (not illustrated).

Protocol characterization layer (PCL) 305 rests over physical layer 309 and is merged with the other stack layers namely the transport, network, and data link layers. More granular depiction of PCL 305 is depicted in association to the right via connector (double ball). PCL layer 305 includes a protocol characterization API layer 311. PC API layer 311 intersects application layer components and protocol characterization components. It serves as an interface through which mutual understanding of a running application and the protocol characterization layer components may be acquired. It recognizes user application functions and those of applications running on the gateway device.

PCL 305 may include a dynamic intelligent logistic operation (DILO) layer 312 resting on top of a static control logistics operation (SCLO) layer 313. The SCLO layer and DILO layer provide an application enabling an intelligent communication bridge to middleware operations. SCLO 313 is the foundation layer for dynamic intelligent logistic operation (DILO). SCLO 313 maintains all of the data relative to control layer relative to the socket and port masking of the PCL API. DILO layer 312 is built from the information in SCLO layer 313. DILO layer 312 oversees the creation of protocol structures and workflow operations for all of the protocols supported by the gateway device. DILO has socket masking and reverse masking capability among other capabilities that are discussed further below. Protocol applications are built initially from XML input to the intelligent program InP describe further above with respect to FIG. 1 SW 105. It is noted that all of the PCL functionality is represented in SW 105.

It is noted here as well as further above a protocol may be submitted to the InP on a gateway device by direct file injection method (XML) or by indirect data acquisition method and creation of an XML characterization file (XCF) for that particular protocol. By either method a protocol characterization file is created or assembled that contains all of the necessary information relative to that protocol. A characterization file or (XCF) includes all of the protocol information for that particular protocol including how the control flow for
building a profile is undertaken in the layer.

SCLO layer 313 has access to program units termed "seeds" by the inventors. A seed is a small unit of a program having one input into the module and two or more outputs from the module, the module adhering to a single "unit" context. Seeds are the building blocks that the intelligent program InP uses to construct protocol application profiles or process control flows. A seed may be switched from one state to another such as from a compile state to a run state, for example. In this way a better application profile might be constructed using the smallest possible memory footprint to store the profile. In one embodiment seeds may be sorted in the SCLO layer by size and they may be further classified and associated to specific rules that sort the seeds according to fitness of the seeds.

DILO 312 enables intelligence gathering to aid SCLO 313 in building protocol application profiles using seeds identified via a, intelligent (IT) learning algorithm 319 depicted in association with DILO 312, SCLO 313, and data acquisition layer (DAL) 314. The purpose of DAL 314 is protocol data abstraction from HAL (Hardware Abstraction Layer). DAL 314 aids the sub device to acquire information from the host machine.

An intelligent program (InP) requires information about the protocol to predict the nature of the protocol (how it operates) and to enable a build operation of a APP profile representing that particular protocol and operation. One way to acquire the information is to communicate the nature of the protocol from the sub device requesting to use the protocol with the gateway to the InP running on the gateway.

In one embodiment an XML characterization file (XCF) is created on the sub device and communicated to the gateway by push operation. Another method may be to acquire the data and then build the XCF on the gateway device using the InP. Data acquisition from DAL may be polymorphic or multiform data collection.

DILO 312 adds intelligence in building optimum protocol applications with the aid of IT learning algorithm 319. DILO functions to help build the workflow of an application in a specific protocol by retrieving a set of seeds identified through results of execution of the IT learning algorithm 319. IT learning algorithm 319 is a machine learning algorithm that takes previous results of operation as input to produce more fit selection of seeds for building subsequent protocol structures and workflow applications.

A Hardware Abstraction Layer (HAL) 320 is depicted in association with DILO 312, SCLO 313, and DAL 314. HAL 320 is assumed present in the stack and functions as an interface between the hardware components and a higher profile SW stack. PCL layer is executed from HAL 320 and may fetch (request and receive) information from device drivers implemented on the connected sub-devices communicating through the gateway device. The fetched data aids in determination of what type of devices are active under the gateway and what protocol or protocols are required for support of the device communications.

HAL 320 includes BUS data including UART, RS232, 12C/SPI. In general, the static layer (SCLO) performs the socket operations on the BUSES via socket over serial method and serial over socket method (socket masking). This enables the BUS to communicate with the sub-device using a socket. Therefore a classification of the device and device protocols must be obtained before creating a high level application profile for the sub-device.

A XML characterization file or XCF tells the SCLO that what kind of device is active under the gateway and based on that information, the DILO program in concert with the SCLO program creates a APP profile with and without socket masking. Serial devices require socket masking to enable communications with higher software layers. An industrial MODBUS/MODBUS Plus protocol is one of the example of the overall technique.

PCL 305 includes a security layer 315 depicted in association. Security layer 315 helps to secure operations in the PCL. The IoT gateway device hardware (Beagle Bone) includes a few security features such as data encryption, authentication, secure booting, and features for securing data in transmission. In one embodiment, PCL 305 uses similar security regimen in constrained platforms like Beagleboard, Intel Quark, UDOO board, or Radx board devices. Security layer 315 supports security features for both hardware and software.

Security layer 315 supplements security features already available on a proprietary board such as those described above. Security layer 315 may be an optional layer give security measures already provided in boards like Beagleboards, however for an IoT application it is desired that security for data in operation, etc is greater than what is currently provided stock on the board. Security layer 315 may provide security for all other software packages on the embedded system (Iot Gateway device). All of the security features may be embedded in the PCL security layer 315. For example a Beagle Board device has Atmel TPM 1.2, Atmel ECC108, Atmel ATSHA204, Atmel ATAES132 and Atmel ATMega328p IC's in the board. Therefore it supports Secure Boot, VPN/SSL endpoint, Hardware digital wallet, Random number generator, Authentication Device and AES 128 Encryption in hardware. All of these features not only protect the hardware but also support firmware and higher end software added in the device.

Management of SCLO 313 (Static Layer) aids in meeting the needs of the intelligent logistics operation (DILO) 312 in the PCL layer. The static layer (SCLO) enables all the features for building an application in the intelligent layer (DILO). Static layer management includes resource, memory, and process management operations. Static layer management interface also supports thread modeling and management. Resource management involves managing the resources used by DILO 312. Memory management involves managing the memory on the devices used by the resources. Process management and memory management are closely related. Both routines are at least partly controlled by an open MP application program interface mechanism (not illustrated).

The SCLO 313 helps to manage seeds needed to build an application profile in the intelligent layer (DILO). In one embodiment a seeds fitness engine (not illustrated) is provided in PCL 305 to calculate the fitness of seeds used to build a profile or workflow. The fitness calculation engine may be provided in a layer that manages all of the seeds and application profiles in the static and dynamic logistics layers. The intelligent learning algorithm is used to optimize seed application to new protocol application profiles. Seeds have positional characteristics (where they fit in an application) expressed as statements along with an input and two or more outputs. Seed fitness checking may be a continuous process for any protocol specific application. Initial seed selection and population may be performed by iterative algorithm.

It is noted herein that thread parallelization and serialization for the PCL added to the OSI stack on the IoT gateway device must be efficiently performed on the device due to limited resources. Thread parallelization is an important function in the protocol characterization layer. The PCL utilizes thread parallelization in the InP processing and at its processing core. In one embodiment a thread throttling mechanism (not illustrated) is provided in the form of a host/guest (HG) resource-based (R) thread-throttling (TT) mechanism or (HGRTT) mechanism. In the process, a host program in the PCL builds the guest program in the PCL according to the application requirements. Each application includes resource management system (RMS) for run. When the host program build the guest program, the host program retains control of the thread or threads it created. These may be serialized or parallelized according to the needs of the application architecture.

In one embodiment the PCL also includes an intelligent switching state mechanism (compilation unit) (not illustrated) for optimizing program flow by switching an application to the front or back of processing queue based on the amount of resource drain on the processing utility. The feature may be operated by the intelligent program (InP). When it is building an application profile it may first check the available resource of the processing utility and build the profile accordingly.

Figure 4:
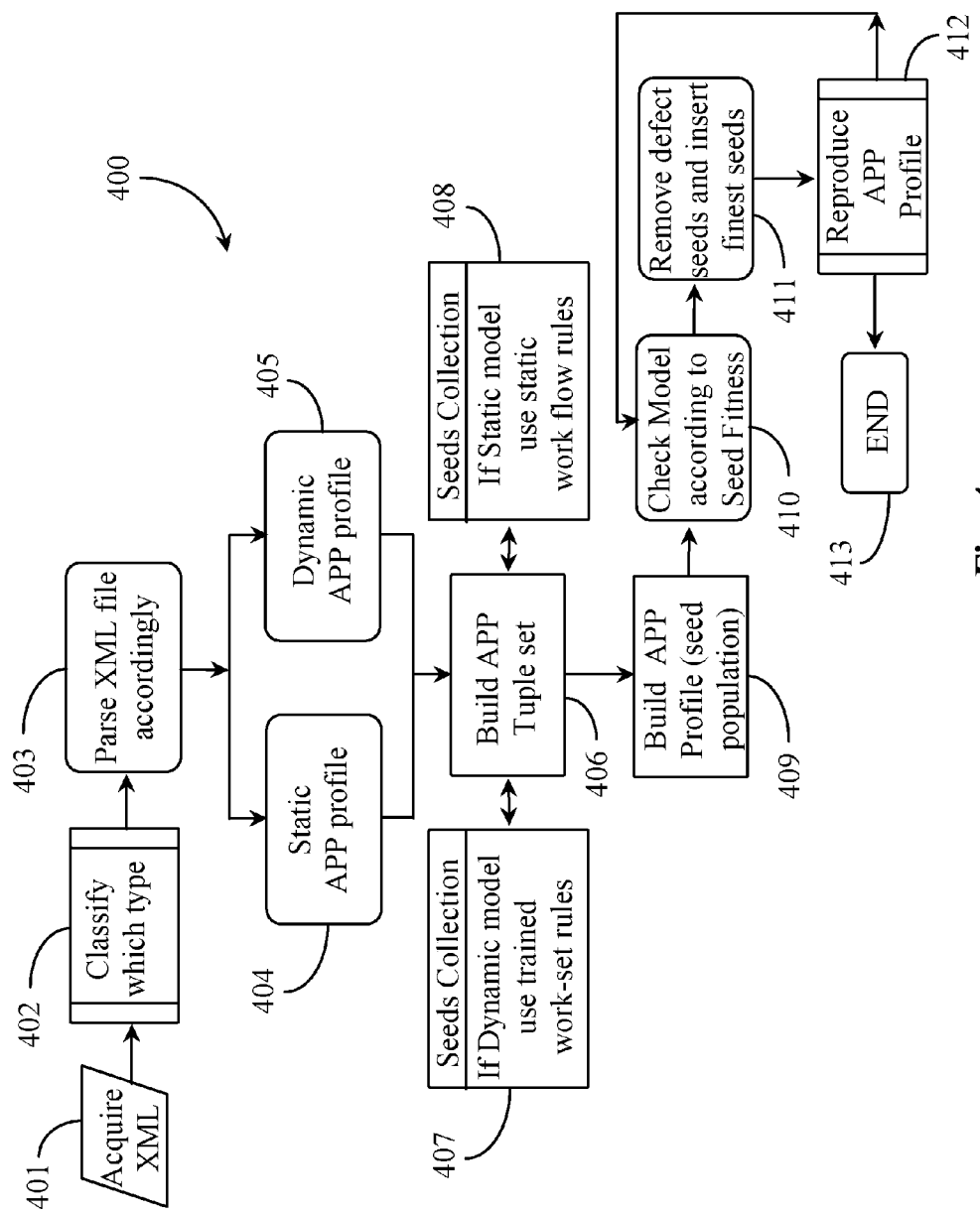
FIG. 4 is a process flow chart depicting steps for building common executable work flow or operation structure relative to a particular protocol for outgoing data from the gateway device of the present invention.

FIG. 4 is a process flow chart 400 depicting steps for building executable work flow or operation structure relative to a particular protocol for outgoing data from the gateway device of the present invention. In step 401, an intelligent program (InP) such as that contained in SW 105 of FIG. 1 acquires, receives or builds from received data, an XML file that characterizes the tuples of a protocol application run by a sub device connected to a gateway device. In one aspect the InP builds an XML characterization file or XCF that characterizes the protocol application tuples.

In step 402, the InP may classify the application protocol tuples as static or dynamic. In step 403 the InP may use an XML parser to parse the characterization file to list all of the protocol-specific components or tuples, configurations, and control flow information associated with the protocol interface communications etc. The result of step 403 may lead to building either a static application profile for the protocol in step 404 or a dynamic application profile for the protocol at step 405. A static model is parsed with tag headers while a dynamic model is parsed with no tag headers. At this point the application profile for the protocol may not be wholly complete in the protocol application generalization process.

Static Model tag headers may include name (protocol), interface (device type), DISCOVERY (discovery program), DISCOVERY_LKP (discovery look-up of devices), BI-DIRECTION (duplex communications), SOCKET (socket details/XML child data), SERVER_ADDRESS (server IP address), SERVER PORT, CLIENT ADDRESS (IP address), CLIENT PORT, MSQ_ENABLED (message queue enabled/disabled), PMASKING (port masking enabled/disabled), DOMAIN (domain of the protocol socket), TYPE (socket types), and TRANSPORT (transport medium of the socket).

Data collected from the static model may be used to build train-set data for support of dynamic modeling. The following notation represents workflow rules for building a trained set of data tuples:

```
if (INTERFACE == ttyUSB || INTERFACE == ttyS)
{
* check the first 3 letter "tty"
```

```
Its a Serial device
Message Queue Needed (MSQ_ENABLED)
IP Socket needed
(SERVER_ADDRESS,CLIENT_ADDRESS,SERVER_PORT,CLIENT_PORT,PMASKING,TRANSPORT,TYPE)
Two Application needed Client and Server (B-DIRECTION)
} else if(INTERACE == B_SOCK)
{
Its a BNEP (Bluetooth Network Encapsulation Protocol) Socket
IP Socket needed
(SERVER_ADDRESS,CLIENT_ADDRESS,
SERVER_PORT,CLIENT_PORT,TRANSPORT,TYPE).
Two Application needed Client and Server (B-DIRECTION)
} else if(INTERFACE == ETHERNET)
{
Its a Socket device
Message Queue Needed (MSQ_ENABLED)
IP Socket needed
(SERVER_ADDRESS,CLIENT_ADDRESS,
SERVER_PORT,CLIENT_PORT,TRANSPORT,TYPE)
One Application needed Client and Server (B-DIRECTION)
}
else if(INTERACE == UPNP_SOCK)
{
Its a UPNP Socket device
Message Queue Needed (MSQ_ENABLED)
IP Socket needed
(SERVER_ADDRESS,CLIENT_ADDRESS,
SERVER_PORT,CLIENT_PORT,TRANSPORT,TYPE).
One Application needed Client and Server (B-DIRECTION)
} else if (
INTERACE == WIFI)
{
Its a IPv4 Socket device
Message Queue Needed (MSQ_ENABLED)
IP Socket needed
(SERVER_ADDRESS,CLIENT_ADDRESS,
SERVER_PORT,CLIENT_PORT,TRANSPORT,TYPE).
One Application needed Client and Server (B-DIRECTION)
}
```

In dynamic modeling, values are not static and the file may be parsed with no tag headers. In dynamic modeling classification of collected attributes may be required. In one embodiment of dynamic modeling a probability transition matrices table (not illustrated) may be provided for checking similarity of seeds to attributes in the XML data . . . . At step 406 the InP may build a complete application tuple set for the protocol by adding seeds from a local seeds collection or pool.

If the profile is dynamic, the InP may use rules for trained workflow data sets (app profiles previously built and stored) to collect seeds from the seeds collection in step 407. If the model is static then the InP may use static work flow rules when collecting seeds for population in step 408. Once the seeds are collected the InP may complete the application profile by assembling the collected seeds to the model in step 409. A sample profile application for a Zigbee client device is included as follows:

Zigbee Persistent Socket Communication Application with Message Queue

```
/* Sample Application File for Canonical Zig-Bee Client APP*/
#include "../constructor/p_flow.h"
#define _ret int
#define _rot void*
#define IP_ADDR "127.0.0.1"
#define PORT_ADDR "8001"
#define MSG_FLAG 1
#define APP_CLIENT 0
#define APP_SERVER 1
#define DEVICE "/dev/ttyUSB0"
main( )
{
_ret _p1,_p2;
_rot _p3;
_p1=_serial_device_pipe(DEVICE);
_p3=_serial_socket_pipeMSG(IP_ADDR,PORT_ADDR,APP_CLIENT);
_pipe(_p1,_p3,APP_CLIENT);
_flush(_p1);
_flush(_p2);
_flush_context(_p3); // Macro Set
```

At step 409 seed population occurs. In one aspect, seeds are collected from a seeds library according to any needs of the protocol application profile being built. The seeds collection includes seeds emulating parts of the operations required to build a protocol application. In one aspect a self-learning algorithm is used to collect the seeds. As described previously, if the model is static the algorithm consults workflow rules for static modeling. If the model is dynamic, the algorithm uses trained-work-set rules for dynamic modeling of the protocol application. Seeds are small compilation units of a task. Seeds may connect to one another like tuples. A tuple is an ordered list of elements. A seed has a parametrized argument and two or more output statements. A seeds argument is an output of another seed in the assembly of the model. Seed execution flow mimics tuple ordered flow. More particularly the ordered list of elements (tuples) are equal to a sequenced execution flow of appropriate seeds.

In step 410 a fitness engine may be used to evaluate or otherwise check the created protocol application profile for seed integrity, meaning that all seeds together solve all issues for obtaining optimum functionality for the protocol applications services and capabilities in operations and in communications. Fitness checking is performed in the intelligent layer (DILO). Seeds may be classified according to specific rules and stored in the seeds library vertically or horizontally to imply differentiation in fitness level of the seeds. Seeds have a positional attribute (where they fit in application). This attribute may also contribute to a fitness calculation. It is noted herein that genetic programming techniques may be implemented to rank profile application seeds for fitness level.

At step 411, defected seeds in an application profile for a protocol may be removed and the finest seed from the seeds collection may be inserted into the model to replace the defected seeds. In one example it might be that a protocol requires an application with a serial interface. The intelligent program selects the finest seeds for that particular serial interface type. In actual practice most machines support RS 232 serial interface among many available types of serial interfaces. Therefore, the intelligent program selects RS 232 seeds by default and ads a socket to the serial port. The rest of the seeds representing the other features of the socket application may also be selected and added.

At step 412 the InP reproduces the application profile for future use. The process may end for that particular protocol app request at step 413. It is noted herein that other steps may be added to process flow 400 without departing from the spirit and scope of the invention.

Figure 5:
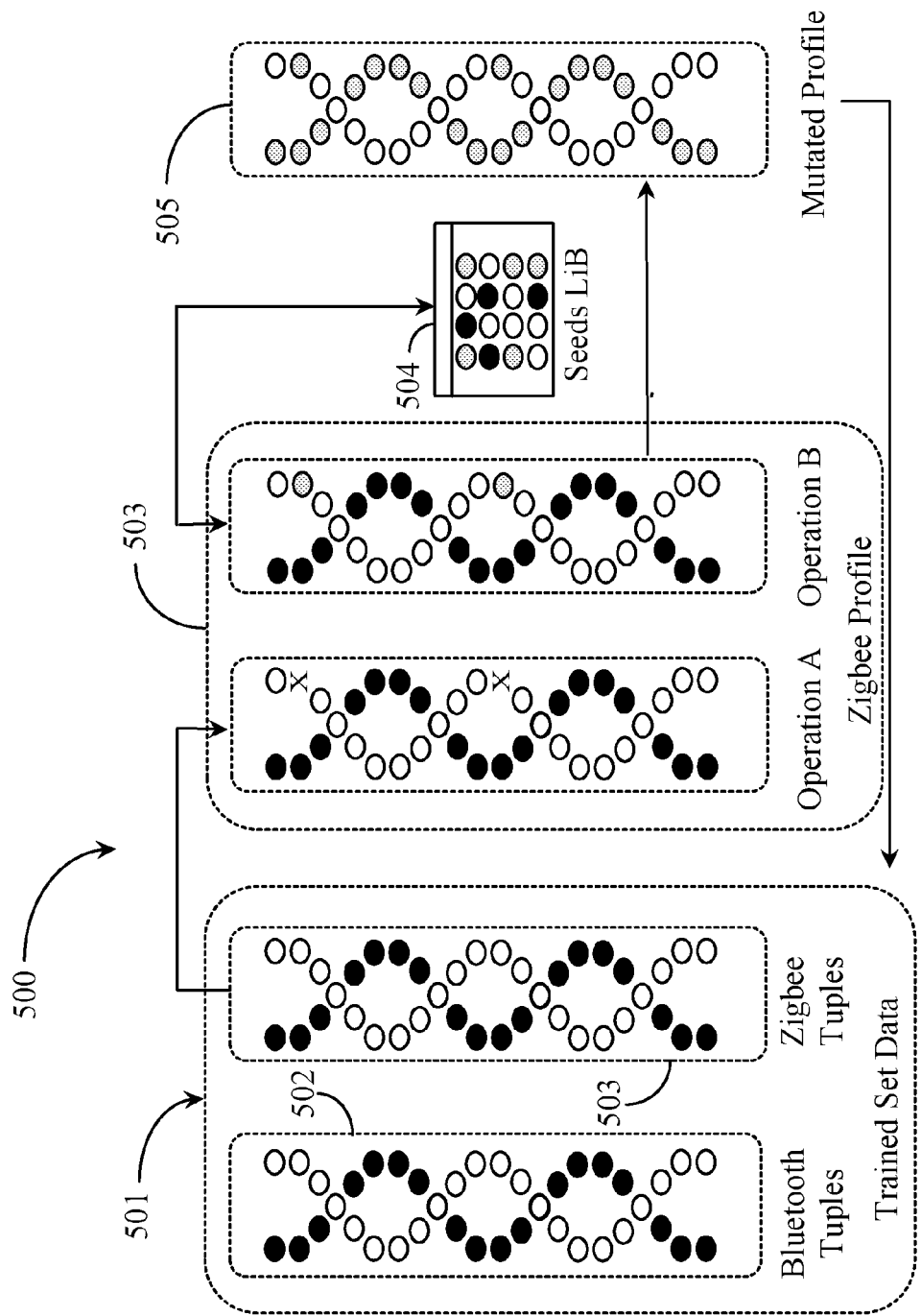
FIG. 5 is a block diagram depicting development of a new protocol application profile from trained data sets.

FIG. 5 is a block diagram 500 depicting development of a new protocol application profile from trained data sets. Block diagram 500 depicts a set of tuples 501 stored in memory on a gateway device as trained data sets or application profiles previously built for protocols used by one or more sub-devices connected to the gateway. In this example, the available protocol application profiles are one of a set of Bluetooth tuples 502, and one of a set of Zigbee tuples 503. Each tuples set represents an application profile for that particular protocol. In this example each seed (compilation unit) is visualized as a piece of the genetic code of the host set of tuples.

In this example tuples set 503 (Zigbee Tuples) is selected for a fitness operation described further above relative to the process flow of FIG. 4. The fitness operation may use a fitness engine (ordered execution of algorithms) to perform a seeds fitness check. Seeds fitness may occur in two operations performed synchronously and represented herein as operations A and B.

In operation A, the fitness engine removes any defected seeds from the selected protocol application profile. This is depicted herein by an X in the assembly at each place a seed has been removed. In operation B, the fitness engine inserts the finest seeds into the genetic model replacing the defected seeds removed in operation A. In actual practice the determination of defected seeds may be made after the finest seeds are known for replacing them. Therefore the operation may be synchronous with each defected seed removed and replaced with a finer seed in a single pass.

The replacement seeds are lightly grayed in this depiction to differentiate them from the preexisting seeds. The operation is termed a "crossover" of seeds operation by the inventors. The optimized protocol application profile may then be reproduced as a mutated profile 505 representing a new protocol application profile candidate in the trained set data of previously generated application profiles. In one embodiment a protocol application profile may include features applicable to or dedicated to two or more specified protocols the two or more protocols supported by the mutated protocol application. It is noted herein that generation of hybrid protocol applications (supporting more than one protocol) is possible in the fitness checking operations.

A self-learning algorithm may perform fitness seed selection and as operations are ongoing the system learns the finest protocol applications used on the gateway and performs protocol application seed fitness with fewer crossover seeds. It is also noted that as protocols continually develop and new protocols are introduced, the system may adapt to support any newer protocol by collecting tuples from a sub device and generating a new application profiles for building the required application specifics for the requesting application running on the sub device.

Figure 6:
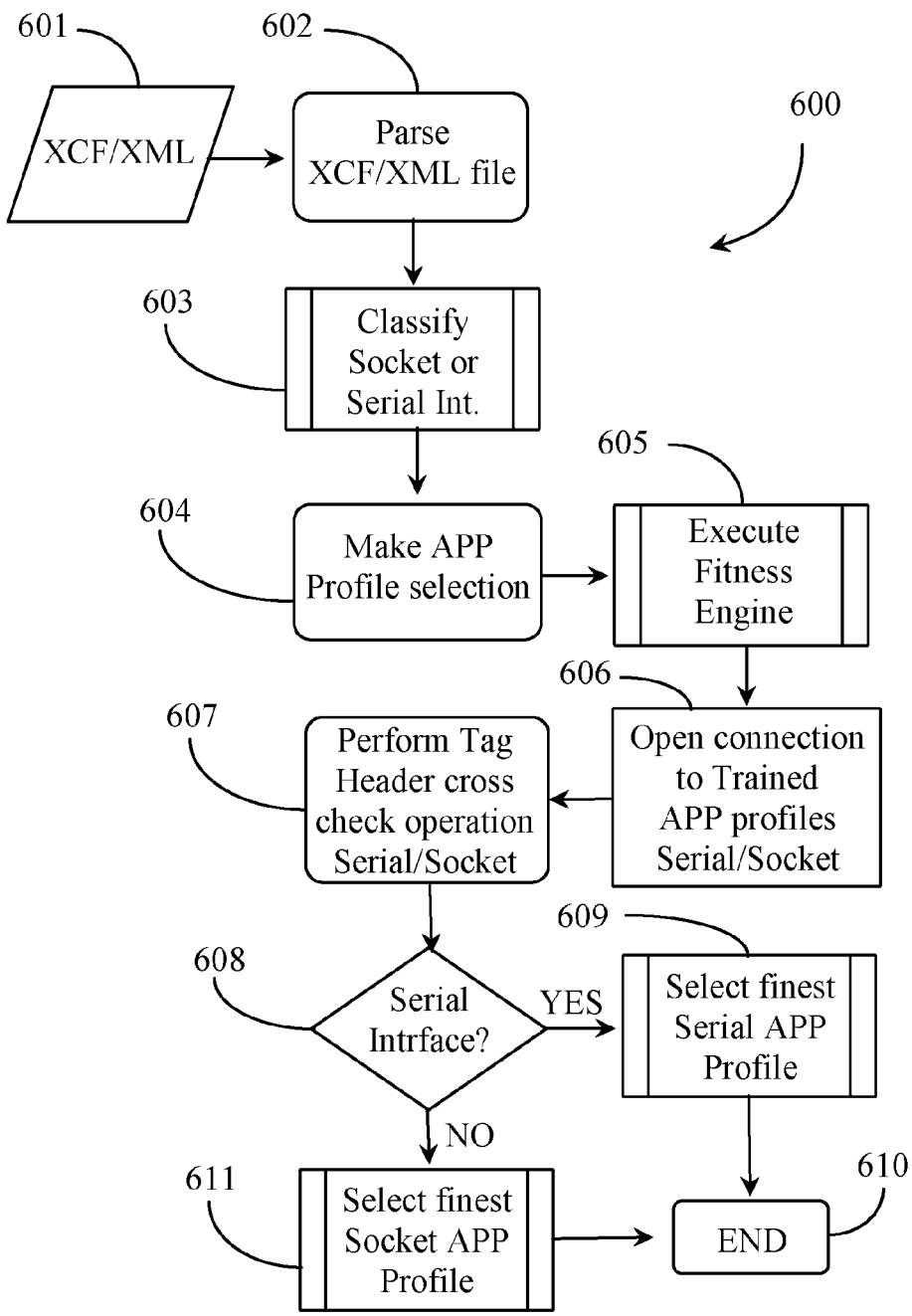
FIG. 6 is a process flow chart depicting steps for determining a best protocol application profile on a gateway device based on input characterization data.

FIG. 6 is a process flow chart 600 depicting steps for determining a best protocol application profile on a gateway device based on input characterization data from a sub device running the protocol. In step 601 the intelligent program or InP, which includes the protocol characterization layer (PCL) obtains or receives XML data including characterization data of a particular protocol requesting support from a gateway device.

In one embodiment an XML characterization file (XCF) is obtained or received that characterizes the requirements for the protocol application requesting support from a gateway. The XML/XCF data may be parsed in step 602. At step 603 the protocol may be classified as a socket protocol (requires a socket application or a serial protocol requiring a serial port application) in communications through the gateway. At step 604 the InP selects a best in house protocol application profile that would represent the best solution for "building" a protocol application meeting the requirements of the protocol in light of the knowledge received from the parsed data.

In one embodiment selecting the application profile in step 604 is achieved by a process described in the following steps 605 through end at step 610. At step 605 a fitness engine may be called (executed) to ensure that the application profile selected at step 604 is the finest selection available on the gateway device. At step 606, the fitness engine may open a connection to trained application profiles (socket and serial). At step 607 the fitness engine may perform tag header cross check operations on the tuples set. At step 608 the fitness engine determines if the protocol requires a serial interface. If a serial interface is not needed in step 608 the engine selects a finest socket application profile for the protocol in step 611. If a serial interface is required at step 608 the engine may select the finest serial application profile for the protocol at step 609. The process may end for that gateway request at step 610.

In one aspect defect calculation to find unwanted or defective seed in an application profile uses a tag header comparison technique. FS=Finest Seed of t3(s2)=s3=t3(s3) Cross Over (Seed removal replacement) s2↔s3. The process of cross over is performed over all of the seeds contained in the tuples of the application profile to remove and replace the seeds in the tuples. The amount of work the process requires depends at least in part upon the number of defected or unwanted seeds found in a set of tuples representing an application profile.

After disseminating the XML data, a working environment may be established for that particular protocol. The initial configuration for execution of the program workflow may also be performed. In characterization of heterogeneous protocols, each particular protocol may have an environment for working. The protocol specific work environments may all be categorized under one umbrella model. In summary, the SW running on the gateway may provide services such as attribute classification and tag header classification, working environment setup (protocol), set up of a discover application for discovering protocols; verifying initial configuration for the protocols, and consulting the trained set data containing execution flows (protocol application profiles). In attribute classification, the class definition may depend at least partly on what interface is required in communications (serial or socket).

Figure 7:
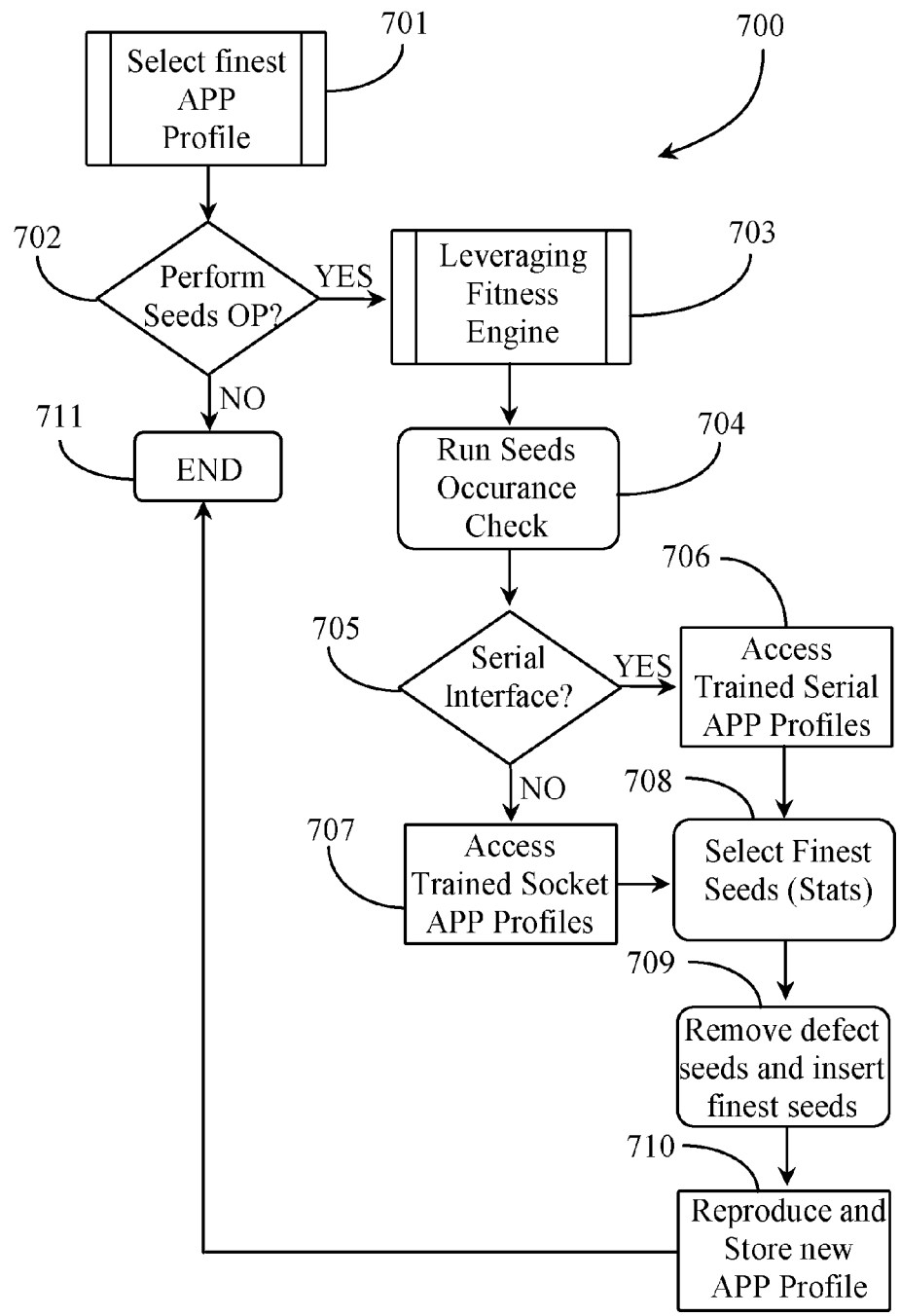
FIG. 7 is a process flow chart depicting steps for optimizing seed structure of a selected application profile.

FIG. 7 is a process flow chart 700 depicting steps for optimizing seed structure of a selected application profile. It is assumed in this process that a finest application profile has already been selected at step 701 based on incoming XML data and appropriate processing the determine the finest profile for the requesting protocol application. In one aspect a seeds fitness operation my be performed on the application profile selection of step 701.

At step 702 the InP may determine whether to perform a fitness calculation on the seeds (compilation units) of the profiles application workflow. In one aspect, fitness calculations and profile enhancement is a relatively ongoing or continuous process to ensure the finest protocol support at the gateway. In one aspect of the method, the fitness calculations may be manually initiated or scheduled to run at certain intervals or periods.

It may be determined at step 702 whether to perform a seeds fitness operation on the selected application profile. If it is determined not to initiate a seeds operation at step 702 the process may end for that request in step 710. If it is determined at step 702 to perform a seeds fitness operation the process resolves to step 703 where a fitness engine may be executed. The fitness engine may run a seeds occurrence check at step 704. A seeds occurrence check determines the repetition of seeds in the trained application profile data set that may be similar to the selected application profile. In one aspect the program also checks the seeds occurrence both horizontally and vertically in the application profile data.

Before the seeds occurrence check accesses data, the system recalls whether the interface type is a serial interface (default) at step 705. If the interface type is serial at step 705 the process moves to step 706 where the fitness engine accesses trained data sets representing serial profile applications similar to the one selected for the protocol. If the interface type is socket rather that serial, the process moves to step 707 where the engine may access trained data sets representing similar socket type application profiles for the particular protocol.

At step 708 the fitness engine selects the finest seeds observing the prevalent statistics relative to seeds occurrence. At step 709 the fitness engine may remove defected or non-optimal seeds from the selected application profile and may insert the finest seeds into the profile genetics according seeds occurrence stats and fitness calculations relative to function and capabilities of the seeds. Once the application profile is created with the finest seeds inserted, it may be reproduced at step 710 and may become the new finest trained data set representing the protocol application.

In one aspect a modified genetic programming paradigm is used to perform the fitness calculations of the application profiles and of the individual seeds used to build them. In place of building multiple and random segments of code to solve defected profile applications after a fitness calculation, the process instead uses a mutually compatible comparison mechanism to resolve defects and produce the best available solution for that protocol request. In one aspect, seeds are added to replace defective seeds at specific positions in the application work flow.

A simple equation may represent the process. If s1, s2, s3 . . . sn represent the seeds collection and t1, t2, t3, . . . tn represent the tuples sets in the tuples collection (application profile selected), and if the finest application profile=t3 then t3=s4+s2+s5+s7+s8.

Figure 8:
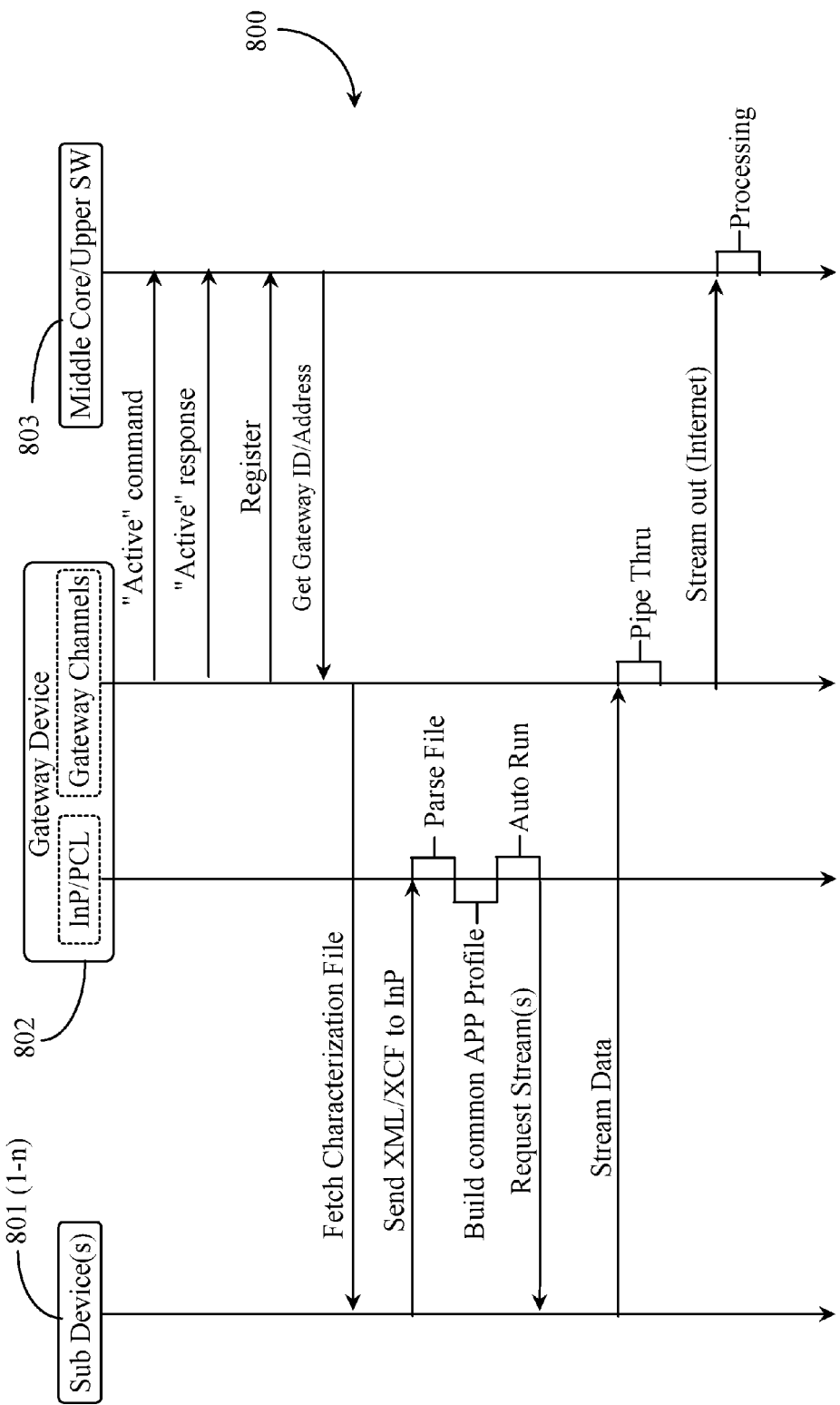
FIG. 8 is a sequence diagram depicting interaction between the gateway device of FIG. 1 and connected sub-devices, and interaction between the gateway device and a middleware platform according to an embodiment of the present invention.

FIG. 8 is a sequence diagram 800 depicting interaction between the gateway device of FIG. 1 and connected sub-devices, and interaction between the gateway device and a middleware platform according to an embodiment of the present invention. In diagram 800, sub devices 801 (1-$n$) are depicted. Sub devices 801 (1-$n$) are analogous to sub devices 203 (1-$n$) of FIG. 2. Sub devices 801 (1-$n$) have wireless connection to an IoT gateway device 802. Gateway device 802 is analogous to one of gateway devices 202 (1-$n$) of FIG. 1.

IoT gateway device 802 has network access to an upper SW platform 803 including middleware core for processing data received through gateway device 802 from sub devices 801 (1-$n$). Upper SW platform 803 is analogous to middleware cloud 204 of FIG. 1. Whenever a new IoT gateway device is added to the network it may first be registered with upper platform 803. Gateway device 802 will make an "Active" command to Upper SW 803, which will respond with an "active" response. Then Gateway device 802 may send a request when brought online to register for communications with upper platform 803. In this process the upper platform (middleware) gets the gateway identification (ID) and network address (IP). After successful registration and initialization (stream ready) gateway device 802 may fetch or otherwise acquire or receive an XML characterization file (XCF) characterizing a particular protocol application attempting to communicate through the gateway.

In actual practice there are sub operations involved in setting up a gateway device for communications beyond registration and obtaining a unique ID from the device. For example, if a new unregistered gateway is started on the network the message queue telemetry transport (MQTT) routes for setup and setup reply are started prior to MQTT request and response routes. Four MQTT routes may be established between gateway device 802 and the upper platform 803 after registration. First of these is iotmkgate-wayid>/request that listens for requests from middleware in the upper platform. Another of these is over which gateway responses are routed back to middleware in platform 803.

Another of the four MQTT routes is iotm/setup for a global channel. The gateway device may listen for common set up information sent from middleware to the gateway device. The final MQTT route is for streaming data from sub devices to the middleware for processing.

When a new and unregistered gateway is started, the iotm/setup and iotm/setupreply MQTT routes are started before starting Request and Response MQTT routes. The iotm/setup and iotm/setupreply carries data back and forth between the upper layer-platform and the IoT gateway device. The gateway device may be activated after setting up the routs by initializing its usual services. It may be noted here that after initialization of the gateway device, the gateway device may initialize two threads on the device. These are a discovery interrupt sender thread and a stream interrupt sender thread.

Discovery interrupt sender may send discovery interrupt packets to any connected Xbee sub device to keep the stream open. The stream interrupt sender reads from a queue on the IoT gateway device. All unprocessed stream requests are left in queue until they can be processed. In this way the streamer on the sub device may be prevented from entering a sleep mode after some period of time.

When a new sub device or a new protocol application is connected to IoT gateway 802, the gateway may access the sub device in order to fetch data from the device. In this example the data may be contained in an XML characterization file (XCF). In one embodiment IoT gateway 802 may send a request for characterization data that characterizes a protocol application that wants to use the gateway.

The sub device (801) may send XML or XCF data in a response to IoT gateway 802. This data may be received by an intelligent program (InP) in the protocol characterization layer (PCL) in the OSI stack on the device. The InP on gateway 802 may parse the received file or files and build a common protocol application profile to use as input for constructing a protocol application that meets the requirements of the communicating sub device application.

Building the protocol workflow may include fitness calculation of the protocol application profile selected in the PCL to support the application request from the sub device. The program may replace defected seeds with finer seeds making up the compilation units of the application communications workflow. The final protocol application may be automatically executed to set up streaming from the connected sub device. The connected sub device receives a request from IoT gateway 802 to initialize data streaming to receive data from the sub device. The device stream may include sensor data or other data from the device that may be processed for data results relative to the dedicated function or functions of the devices or applications running on the devices.

The connected sub device may stream data to the gateway device, which now has the finest protocol-based application to handle the data stream coming in from the sub device. The incoming data stream is piped or tunneled through a dedicated gateway communications channel from the receiving end of the device to the output end of the device. The IoT gateway device outputs the stream over the Internet to upper platform 803 containing the middleware responsible for processing the streamed data. The data may be processed for results at the middleware level. Platform 803 may respond back to the gateway device with any requests or instructions to be routed to the active sub device.

It is noted herein that more than one sub device may connect to a single gateway and more than one gateway may connect to the upper SW platform containing the middleware application without departing from the spirit and scope of the present invention. It may also be noted herein that the upper platform may include a middleware application program interface (API) that enables an administrative user or knowledge worker to access the platform and visualize parameters of the IoT network of gateways and sub devices connected to the network from any network-connected location. Other available data may include any results from stream processing performed in the middleware layer.

Figure 9:
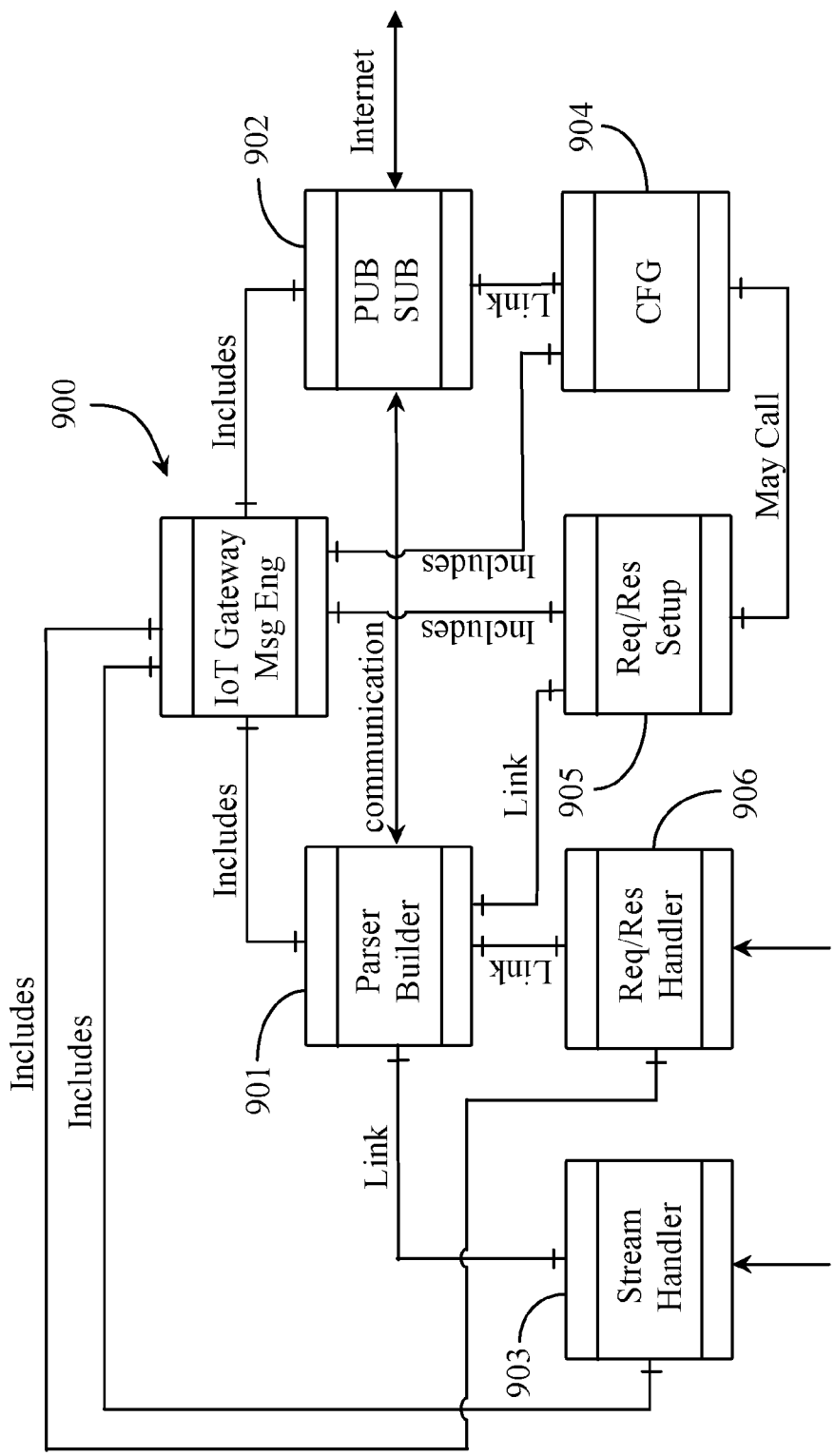
FIG. 9 is a Unified Modeling Language (UML) diagram depicting a model of a messaging engine on the gateway device of the present invention.

FIG. 9 is a UML diagram depicting a model of a messaging engine 900 on the gateway SW platform of the present invention. The Upper Platform of the IoT gateway (middleware), uses a request-response model to fetch data from an IoT Gateway. These Requests are sent over the larger network (Internet) using MQTT (Message Queue Telemetry Transport) because of a fact that MQTT effectively handles the high amount of data requests thereby avoiding an additional overhead of handling large number of requests from multiple gateway devices.

Since streaming of sensor data from gateway-connected sub devices is initiated from the upper platform, more particularly middleware, data is continually streamed until the platform determines to stop the stream at the sub device. Therefore, the SW platform requires a separate stream handler dealing with sensor stream data.

Model 900 is of a messaging model for communicating with multiple gateway devices such as device 802 of FIG. 8. Message model 900 may include at least one parser/build application 901 for parsing incoming data and building response data formats like a reply stream for example. The Message Formats are structured into a Java Script Object Notation (JSON) string. This enables more efficient parsing and building of reply stream data since JSON commonly supported by all of the operating platforms. Message model 900 includes a stream handler 903. Stream handler 903 maintains and manages the incoming data streams(s) including starting and stopping of those streams. Messaging model 900 includes a request/response handler 906. Req/Res handler 906 may handle all incoming requests and responses.

Messaging model 900 includes a request/response setup module 905. This setup module is responsible for setting up handler 906 for particular protocols. Messaging model 900 includes a configuration module 904. Configuration model 904 may be called into action by module 905 to aid in establishing request and response handler for particular protocols. Parser builder 901 may be linked to stream handler 903, req/res handler 906, and to req/res setup module 905.

Messaging model 900 includes a publish and subscribe module 902 for publishing data to gateways and for subscribing to data from gateways. CFG 904 may be called by PUB SUB 902 for configuring protocol-based procedures. A sample messaging format is depicted below for request, response, and stream data.

Request:
{"seqno":695,"command":"PINGGWAY","data":"111.96.206.23","gatewayID":"6C3BE5312FBA"}
Response:

```
{ "seqno": 695, "command": "PINGGWAY", "gatewayID": "6C3BE5312FBA",
"timestamp": "2014-02-      22.12:05:42", "data": "{ \"cpu\": { \"total\": 339327910,
\"work\": 19092520 }, \"memory\": 47.570835, \"network\": { \"tx\": 869323, \"rx\":
1313252 } }", "status": "1" }
Stream Data:
{ "gatewayID": "BC6A29DFD81E", "timestamp": "2014-02-22.12:07:50", "data":
"A30B81", "deviceID":       "13a20040a235de" }.
```

Figure 10:
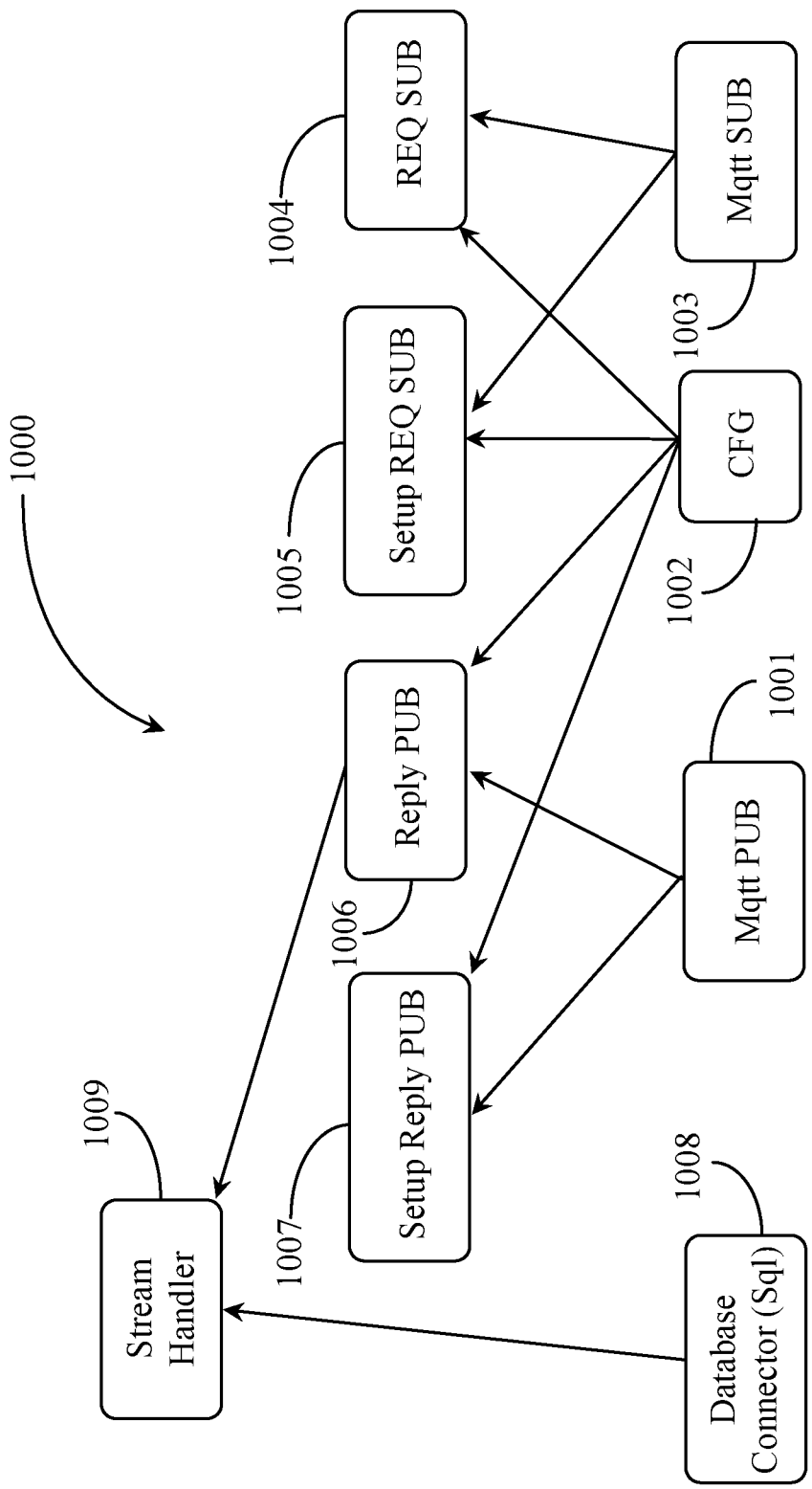
FIG. 10 is a block diagram depicting gateway device communication SW according to an embodiment of the present invention.

FIG. 10 is a class diagram 1000 depicting base and inherited classes in the gateway communications design structure according to an embodiment of the present invention. Classes 1000 include a streamer class 1009 for handling incoming data streams from connected sub devices or from a middleware (upper platform). Class diagram 1000 includes a set-up request subscriber class 1005 and request subscriber class 1004. These modules listen for incoming requests from the middleware application. The requests are, in this embodiment, in JSON format. Hence a JSON parser class may be used to parse the JSON data in incoming requests. Each incoming request includes a command header that initializes the request to a particular route.

Class diagram 1000 includes a set-up reply publisher class 1007 and a reply publisher class 1006. Reply publisher handles replies from the gateway device. When a gateway device is first activated or the device needs to communicate a change in IP address, setup reply publisher class sends out a request to the middleware platform to inform it of active state. It is noted herein that the above mentioned scenario may be the only time a gateway device sends an outgoing request to middleware.

Class diagram 1000 includes a database connector class (sql) 1008, an MQTT publisher class 1001, a configuration class 1002, and an MQTT subscriber class 1003. The command IPSEARACH looks for the IP of the device having a machine address code (MAC) specified in the JSON data of the command request.

Requests in Iotm Setup:
ACTIVEGW means that middleware has set up the gateway device and it is active according to its view.

Requests in route iotm/(gatewayID)/requests:
REGISTER: Gateway responds with unique gateway ID for authenticating on the network.
PINGGWAY: Gateway responds with current status and current resource utilization state.
BTSEARCH: Gateway parses for the data part in the request for BT MAC address and responds with current status of the BT MAC in the Gateway piconet.
IPSEARCH: Parses for the Data part for Device MAC Address and responds with current network address of the IP Device in the Gateway LAN.
ZBSEARCH: Gateway responds with the data in the SQL database in a router-children format represented in a JSON Array in the response data.
UPSEARCH: Searches for the UPnP services in the gateway LAN that may be discovered within a default timeout interval and returns the URI for each Service as JSON Object in a JSON Array in the data portion of the response.
SCPDFIND: Searches for a particular UPnP URI service description and responds with a service description of the UPnP service.
UPNPINVK: Uses the data part of the request to get the service URI, action name and other parameter values.
STRTSTRM Uses the Data part of the request to get a Zigbee device ID and pin to start a particular sensor streaming.
STOPSTRM: Uses the Data part of the request to get the Zigbee deviceID and pin to stop the particular sensor streaming. Any other requests having command headers that are not recognized are discarded.

It will be apparent to one with skill in the art that the Gateway IoT system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A computerized gateway device, comprising:
a central processing unit (CPU);
a power source;
a digital memory coupled to the CPU;
one or both of physical communication ports and circuitry providing a wireless communication interface receiving data in a variety of heterogeneous communication protocols from a plurality of data-gathering devices communicating in differing ones of the heterogeneous communication protocols;
an output interface to a wide-area network;
a plurality of dedicated hardware pipelines managing the data received from the data-gathering devices through execution of firmware in the hardware of the pipelines; and
coded instructions executing on the CPU from a non-transitory medium;
wherein the CPU, executing portions of the coded instructions, connects physically or wirelessly to one of the data-gathering devices, obtains protocol characterization information for the heterogeneous communication protocol generic to the data-gathering device, selects a protocol application profile stored in the digital memory according to the protocol characterization information, identifies and removes pieces of code in the protocol application profile that is not compatible with the information and inserts pieces of correct code, thereby creating and storing a new protocol application profile and programs the firmware in a dedicated pipeline to receive data from the data-gathering device in the new protocol application profile, and communicates that data to the wide area network at the output interface in a generalized protocol compatible with upstream processing nodes.

2. The computerized gateway device of claim 1, wherein the wide area network is an Internet network.

3. The computerized gateway device of claim 1, wherein the protocol characterization information is sent to the gateway, or pulled by the gateway from one of the data-gathering devices in the form of an extensible markup language (XML) characterization file (XCF).

4. The computerized gateway of claim 1, wherein the protocol characterization information includes data specifying an interface type required during communications.

5. The communications gateway of claim 1, wherein the computerized gateway device procures generalized protocol characterization information and builds an XML characterization file.

6. The computerized gateway device of claim 1 wherein the generalized protocol is a request-response model controlled by the upstream processing node.

7. The computerized gateway device of claim 1 wherein the upstream processing node manages the data-gathering devices by downstream messaging to the devices through the computerized gateway device.

8. The computerized gateway device of claim 1 wherein the coded instructions comprise a machine-learning algorithm that builds knowledge of protocol characteristics.

9. A method comprising:
accessing by a computerized gateway device, through execution of coded instructions by a CPU from a non-transitory medium, protocol characteristics from data gathering devices coupled to the gateway device through either physical ports or by circuitry providing wireless communication, the data gathering devices communicating in differing ones of heterogeneous communication protocols;
selecting, by execution of the coded instructions, a protocol application profile stored in digital memory accessible to the gateway device;
identifying and removing pieces of code in the protocol application profile that is not compatible with the characteristics and inserts pieces of correct code, thereby creating and storing a new protocol application profile;
building by execution of the coded instructions, firmware programs consistent with the new protocol application profile for dedicated pipelines to manage data from the data-gathering devices through the gateway to an output interface coupled to a wide area network; and
delivering the data through the dedicated pipelines to the output interface in a generalized protocol compatible with communication with an upstream processing node in the wide area network.

10. The method of claim 9, wherein the wide area network is an Internet network.

11. The method of claim 9, wherein the protocol characterization information is sent to the gateway, or pulled by the gateway from the data-gathering devices in the form of an extensible markup language (XML) characterization file (XCF).

12. The method of claim 9, wherein the protocol characterization information includes data specifying an interface type required during communications.

13. The method of claim 9, wherein the computerized gateway device procures generalized protocol characterization information and builds an XML characterization file.

14. The method of claim 9 wherein the generalized protocol is a request-response model controlled by the upstream processing node.

15. The method of claim 9 wherein the upstream processing node manages the data-gathering devices by downstream messaging to the devices through the computerized gateway device.

16. The method of claim 9 wherein the coded instructions comprise a machine-learning algorithm that builds knowledge of protocol characteristics.

* * * * *